United States Patent

[11] 3,611,436

| [72] | Inventor | William W. Rigrod<br>Colts Neck, N.J. |
|---|---|---|
| [21] | Appl. No. | 795,137 |
| [22] | Filed | Jan. 24, 1969 |
| [45] | Patented | Oct. 5, 1971 |
| [73] | Assignee | Bell Telephone Laboratories, Incorporated<br>Murray Hill, Berkeley Heights, N.J.<br>Continuation-in-part of application Ser. No. 627,493, Mar. 31, 1967. |

[54] MODE-SELECTIVE LASER USING RESONANT PRISMS
12 Claims, 8 Drawing Figs.

[52] U.S. Cl. .................. 331/94.5, 350/160, 350/172, 356/106
[51] Int. Cl. .................. H01s 3/08, H01s 3/10
[50] Field of Search .................. 331/94.5; 350/150, 160, 172; 356/106

[56] References Cited

UNITED STATES PATENTS

| 1,696,739 | 12/1928 | Treleaven | 350/172 |
|---|---|---|---|
| 3,367,733 | 2/1968 | Grau | 350/160 |
| 3,437,951 | 4/1969 | Dailey | 350/150 X |
| 3,443,871 | 5/1969 | Chitayat | 356/106 |
| 3,504,299 | 3/1970 | Fox | 331/94.5 |

FOREIGN PATENTS

| 124,937 | 10/1931 | Austria | 350/172 |

OTHER REFERENCES

Smith, " Stabilized Single Frequency Output from a Long Laser Cavity," IEEE J. Quont Electronic QE- 1, Nov. 1965, pp. 343- 8

Peterson et al., " Interferometry and Laser Control with Solid Fabry-Perot Etalons," applied Optics 5, (6), June 1966, pp. 985- 91

*Primary Examiner*—Ronald L. Wibert
*Assistant Examiner*—R. J. Webster
*Attorneys*—R. J. Guenther and Arthur J. Torsiglieri ABSTRACT: An interferometric axial-mode-selective laser resonator in which one or more resonant prisms form the auxiliary resonator or resonators. Tandem vernier types may provide single-axial-mode operation in solid-state lasers in situations for which it was not previously feasible. In other embodiments a single prism resonator with three reflective surfaces forms a stable and tunable filter for wavelength and axial-mode selection. Wide-band output coupling modulation can be advantageously employed with a resonant prism of electro-optic material.

PATENTED OCT 5 1971

3,611,436

INVENTOR
W. W. RIGROD
BY
Kenneth W. Mateer
ATTORNEY

PATENTED OCT 5 1971 3,611,436

MODE-SELECTIVE LASER USING RESONANT PRISMS

RELATED APPLICATION

This application is a continuation-in-part of my copending patent application, Ser. No. 627,493, filed Mar. 31, 1967, and assigned to the assignee hereof.

BACKGROUND OF THE INVENTION

1. Field of the Invention

This invention relates to optical masers, or lasers, and, more particularly, to single frequency oscillators in which internal mode selection is effected.

2. Description of the Prior Art

The invention of the laser has made possible the generation and amplification of coherent electromagnetic waves in the optical frequency range, generally considered to extend from the farthest infrared portion of the spectrum through the ultraviolet. Due to the extremely high frequencies associated with wave energy in this light range, the coherent waves produced by lasers are capable of transmitting enormous quantities of information. The resultant extension of the usable portion of the electromagnetic spectrum would greatly increase the number of frequency channels available for communication and other uses.

An important element of the laser, when used as an oscillator, is an optical cavity resonator tuned to the frequency of the stimulated emission. The design of resonators at microwave frequencies is a relatively simple matter, typical structures having dimensions of the order of a single wavelength at the chosen frequency. The application of this design approach to lasers is impractical, however, due to the extremely small wavelengths involved. It is necessary, therefore, to design optical cavity resonators having dimensions which are many thousands of times larger than the output wavelength at the operating frequency. Thus, laser resonators are inherently multimode devices, particularly when made long for greater power.

In typical parallel end-mirror resonant cavities, of which the Fabry-Perot cavity is representative, it has been shown that the resonator can be excited in a number of characteristic modes which differ from one another in the number of field maxima both along the axis joining the end reflectors and in planes transverse to the axis. All modes which have the same transverse field distribution, regardless of the number of differing axial, or longitudinal, variations, have the same diffraction loss. These "longitudinal resonances" will occur at frequencies for which the length of the cavity corresponds to an integral number of half wavelengths. If, therefore, the negative temperature medium of the laser provides sufficient net gain over a sufficient frequency range, a plurality of these longitudinal resonances, or modes, can be simultaneously excited even though only the lowest order transverse mode is permitted by diffraction loss discrimination.

The presence of many mode frequencies in a laser is, however, sometimes disadvantageous, particularly one intended for communication uses. For example, significantly more power is required in a multimode laser than in a single-mode laser to produce the desired well-defined output line which stands out clearly from the background emission. In addition, the excitation of many modes has an adverse effect on the laser's stability, on modulation processes, and on demodulation processes, all of which are important considerations in communications systems.

One of object of this invention is, therefore, a laser resonator having a mode system which includes a single preferred mode among a plurality of resonant modes of the cavity containing the negative temperature medium.

As disclosed in the commonly assigned, copending application of A. G. Fox, U.S. Ser. No. 466,365, now Pat. No. 3,504,299, filed June 23, 1965, single longitudinal mode discrimination is achieved by dividing the stimulated energy into two portions, each of which is resonated individually in spatially separate optical cavities having one common end member. By designing the auxiliary cavity to provide substantial loss discrimination against the unwanted side mode frequencies associated with the main cavity, the unwanted modes can be suppressed.

In general, an auxiliary cavity is selected to have a length which produces filter action with no loss at frequencies separated by the oscillation bandwidth of the main laser cavity, and with rapidly increasing loss at nearby frequencies. One end-mirror typically serves both cavities, with a reflective-type beam splitter in the main cavity to effect energy branching toward the external reflector which comprises the second end of the auxiliary cavity. At high-excitation levels above threshold, the oscillation bandwidth of gas lasers can be two or more times the Doppler width of the transition of interest. In order for the free spectral range of the auxiliary resonator to exceed the oscillation bandwidth, its optical length must sometimes be quite small. It is very difficult, however, to build stable four-reflector resonators of sufficiently small size since the assembly of three independently mounted cavity end-mirrors, in addition to the beam splitting reflector, requires eight independent tilt adjustments to a high degree of accuracy. Accordingly, stable compact four-reflector lasers are extremely difficult to build and operate.

SUMMARY OF THE INVENTION

In accordance with the present invention, an interferometric axial-mode-selection laser employs one or more resonant prisms to form the auxiliary resonator or resonators. Such auxiliary resonators can advantageously be made very small, since they are formed entirely within a body of dielectric material. They can also be tuned by varying the index of refraction of the dielectric prism material along the optical path. This variation can be caused by thermal, electro-optical, strain-optical or magneto-optical means.

It is characteristic of the resonant prisms of my invention that they provide at least three dielectric discontinuities forming each auxiliary resonator.

The tandem interferometric axial-mode-selective configurations employing two or more auxiliary prism resonators advantageously may provide single-axial-mode operation in solid state lasers in situations for which it was not previously feasible.

It is also an advantage of my invention that the resonator can be aligned and operated much more easily than analogous configurations employing sets of individual reflectors forming the auxiliary resonator.

BRIEF DESCRIPTION OF THE DRAWING

The invention, together with its various objects and features, will become more readily understandable upon reference to the accompanying drawing, in which.

DETAILED DESCRIPTION

Figure 1:
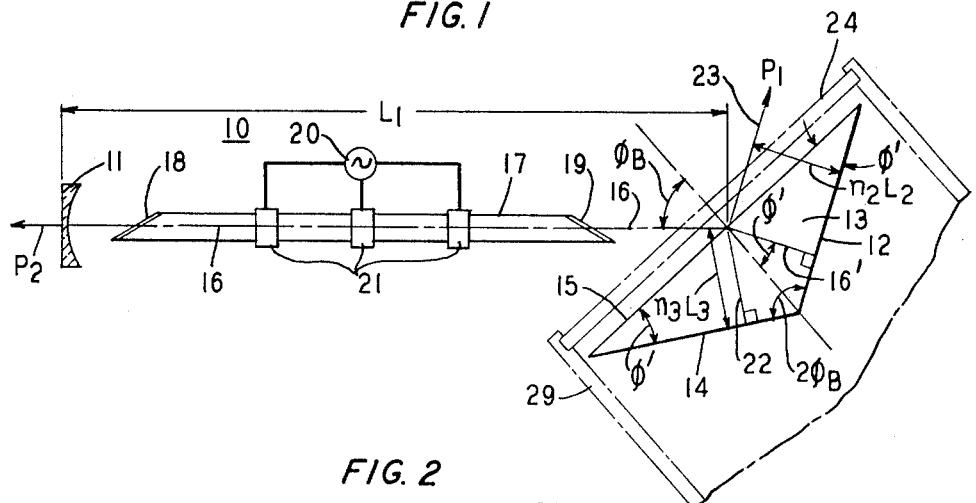
FIG. 1 is a partially schematic view of a laser arrangement in accordance with the invention.

The laser 10 shown in FIG. 1 comprises an active medium disposed within a mode selective optical cavity, as broadly disclosed in the copending commonly assigned application of A. G. Fox, referred to hereinbefore. First and second spaced reflective surfaces 11, 12 define the ends of a primary cavity having a length $L_1 + nL_2$, where $n$ is the refractive index of the prism material along $L_2$. Reflector 11 can comprise a metallic layer on a dielectric base, or a plurality of alternate layers of material of high and low index of refraction, each layer being ¼-wavelength thick at the desired frequency of operation. If energy is to be abstracted through reflector 11, as output $P_2$, the reflector can be made partially transmissive, typically a few percent. Otherwise, the reflectivity desirably is made to exceed 99 percent. Reflective surface 12 forms the opposite extremity of the primary cavity and, in accordance with the principles of the invention, comprises one surface of obtuse-triangular prism 13, to be more completely described hereinafter.

A third reflective surface 14 is positioned opposite a beam splitter or energy dividing means 15, thereby forming a secondary cavity with reflectors 12, 14 as extremities and having a length $n_2 L_2 + n_3 L_3$, where $n_2$ and $n_3$ are the indices of refraction along $L_2$ and $L_3$, respectively. For certain applications, it can be advantageous to position the energy divider 15 at Brewster's angle $\Phi_B$ with respect to the axis 16 of the laser cavity. Prism 13 is then configured and positioned so that the secondary cavity formed by reflectors 12, 15 and 14 defines a resonant structure according to the relationship $$f_{res} = \frac{mc}{2(n_2 L_2 + n_3 L_3)}$$

where $c$ is the velocity of light and $m$ is an integer. Reflectors 12 and 14 typically comprise multiple layer structures deposited on the respective surfaces of prism 13 in a now well-known manner. Beam splitter 15 can comprise, for example, a half-silvered prism surface positioned with respect to axis 16 of the main cavity to achieve nearly equal division of the incident energy. If desired, other energy dividing ratios can be utilized. For given values of $LL_1$, $n_2 L_2$ and $n_3 L_3$, the surfaces of prism 13 are chosen to have curvatures equal to those of the light beams incident thereupon.

The negative temperature, or active medium, which in the arrangement depicted is a gas or a gas mixture, is disposed between reflector 11 and beam splitter 15. So located, the active medium physically is exclusively in the primary cavity. The active medium is shown contained within an elongated tube 17 having end surfaces 18, 19 oriented substantially at Brewster's angle to the energy beam which passes therethrough along axis 16. The gaseous medium can comprise, for example, a mixture of helium and neon excited by a radio frequency source 20 coupled to conductive straps 21 which encircle tube 17. Gaseous lasers of this type and their principles of operation are now well known in the art. It is to be understood, however, that the invention can be practiced with liquid or solid state active media as well as with gaseous media of differing compositions. Furthermore, the excitation for the laser shown in FIG. 1 can be of the direct current type if appropriate.

Resonant prism 13 has a cross section in the form of an obtuse isosceles triangle in which the equal angles $\Phi'$ are equal to the angles of refraction of the energy incident on surface 15 along axis 16. The incident energy is orthogonally incident upon reflective surfaces 12, 14 and is, by reflection from surface 15, resonated therebetween in the auxiliary cavity. The effective path length for energy within the prism depends on the index of refraction $n$ of the prism material as well as the physical lengths traversed by the light beam. Thus the total length of the auxiliary cavity is $n_2 L_2 + n_3 L_3$.

The resonant frequency of prism resonator 15 can be varied in a variety of ways. When a high degree of frequency stability is required, for example, and relatively slow changes in tuning are acceptable, it is convenient to tune the prism by varying its temperature. In this case, the prism can be formed of a low-loss isotropic dielectric such as fused silica, for which $1/L \, dL/dT = 0.6 \times 10^{-1}/°C$. and $1/n \, dn/dT = 7 \times 10^{-1}/°C$., in the visible wavelength region, or $$\frac{1}{nL} \frac{d(nL)}{dT} = -\frac{1}{f} \frac{df}{dT} = 7.6 \times 10^{-6}/°C. \quad (1)$$

(1) At the wavelength of the Argon ion laser, 4,880 A., the thermal tuning rate is given by $df/dT = -4,680$ MHz./° C. A fused silica prism with cavity length of 2 cm., corresponding to a free spectral range of 7,500 MHz., can thus be tuned over one order by a temperature change of 1.6° C.

The prism temperature can best be controlled by enclosure in a hermetically sealed thermostat housing 29. For this purpose, the angle of incidence of energy propagating along axis 16 is selected to be equal to the well-known Brewster angle $\Phi_B$, thereby permitting the use of a Brewster angle window 24 in the oven enclosure 29 for minimum transmission losses of the plane-polarized laser beam. The refraction angle $\Phi'$ is then equal to the complementary angle $90° - \Phi_B$.

Tuning can be also accomplished electro-optically, strain-optically, or magneto-optically using appropriate materials. For example, prism 13 can comprise potassium dihydrogen phosphate (KDP) for electro-optical tuning, potassium tantalate-niobate (KTN) for strain-optical tuning, or yttrium iron garnet (YIG) for magneto-optical tuning.

Figure 2:
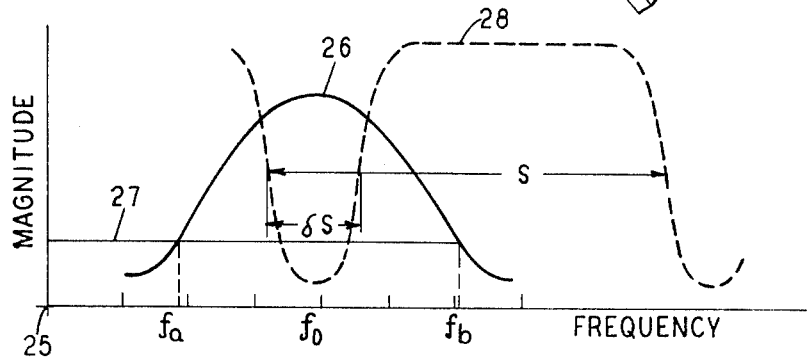
FIGS. 2 and 3 are graphical representations helpful in understanding certain principles of the invention.
Figure 3:
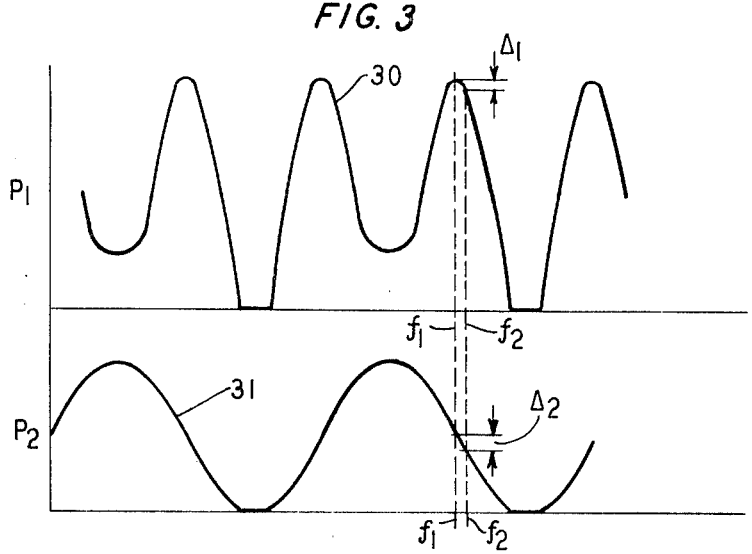

The operation of the multiple cavity arrangement of FIG. 1 will be more readily understood upon reference to FIG. 2 and FIG. 3.

In FIG. 2, the longitudinal mode frequencies of the primary cavity for the lowest order transverse mode are indicated by the short vertical lines along the abscissa of coordinate system 25. These mode frequencies are separated by $c/2(L_1 + n_2 L_2)$. The width of the laser transition in a conventional optical maser is shown by solid curve 26 which is a plot of gain per pass of a light beam through a typical active medium versus frequency. The threshold at which gain exceeds the losses due to scattering, reflection, and the like is indicated by the horizontal loss line 27. It can therefore be seen that all modes having frequencies between $f_a$ and $f_b$ can oscillate in the primary cavity unless measures are taken to suppress them. It can be also easily appreciated that, since a single frequency output is usually technically desirable, such suppression measures are needed more often than not.

One simple way of selecting a single mode is to reduce the optical gain across the entire emission band or, equivalently, to raise the threshold for oscillation until only a narrow portion of the line exceeds it. It is also possible to reduce the length of the cavity, thereby increasing the frequency separation between the modes. Unfortunately, such measures have the undesirable effect of reducing the available output power.

In the three-end-mirror cavity, however, the energy in a beam propagating to the left along axis 16 in FIG. 1 toward divider 15 is split thereby, a portion proceeding on through the active medium to primary cavity reflector 11, and the remainder proceeding to auxiliary cavity reflector 14, disposed normal to the auxiliary cavity subaxis 22. Thus, it can be seen that a secondary resonance can be established for energy propagating between reflectors 12 and 14 via beam splitter 15. The secondary resonance characteristic affects the losses experienced by energy in the primary cavity formed by reflectors 11 and 12, and is used to suppress unwanted longitudinal modes. In particular, the secondary cavity is made to have a high reflectivity only over a band of frequencies which is much narrower than the oscillation bandwidth shown in FIG. 2 to be $f_b - f_a$.

With the separations among reflectors 11, 12, 14 and beam splitter 15 defined as $L_1$, $n_2 L_2$, and $n_3 L_3$, respectively, the fraction of internal laser energy deflected from beam splitter 15 in a direction parallel to axis 23 at a given wavelength $\lambda$ can be written $$\frac{P_1}{P_0} = \frac{4R \sin^2\left[\frac{2\pi}{\lambda}(n_2 L_2 + n_3 L_3) + \theta\right]}{T^2 + 4R \sin^2\left[\frac{2\pi}{\lambda}(n_2 L_2 + n_3 L_3) + \theta\right]} \quad (3)$$

(3) where R and T are, respectively, the power reflectance and transmittance of the beam splitter, and $\theta$ is a phase shift angle due to reflection from 15. The reflectors 11, 12, and 14 are assumed to have $r = 1$. By tuning the auxiliary cavity to have a high reflectivity at $f_o$, as seen from the primary cavity, the loss presented to adjacent cavity modes is made to exceed their available gain and thereby prevent their oscillations. The tuning of the auxiliary cavity can be achieved by proper adjustment of either $n_2 L_2$ or $n_3 L_3$. In the present arrangement, the length is varied by changing the index of refraction of the material of prism 13 in the direction of a primary control along axis 22, only a minimum effect will be experienced along axis 16'; and thus the primary cavity length will remain substantially unchanged. The total length $n_2 L_2 + n_3 L_3$ of the auxiliary cavity will be normally selected to be much less than the total length $L_1 + n_2 L_2$ of the primary cavity.

In FIG. 2, the effect of the addition of the auxiliary cavity is indicated by the loss curve represented by dashed curve 28, which is a portion of the periodic transmission characteristic of the auxiliary cavity. It is convenient to consider the auxiliary cavity as a composite reflector normal to the main laser beam propagating along axis 16. Such a reflector is characterized by a periodic narrow band reflectivity which, when centered at the desired frequency $f_o$ of the primary cavity, acts as a highly reflective end-mirror with associated low loss. All other frequencies within the period of free spectral range of the auxiliary cavity experience lower reflectivity and, accordingly, higher loss as depicted in FIG. 2. The periodicity, S, of curve 28 is $c/(n_2 L_2 + n_3 L_3)$. The width of the resonance, $\delta S$, is determined primarily by the reflectivity of the beam splitter 15. For higher reflectivities, the width $\delta S$ is less. Thus, in an optical maser arrangement in which the side frequencies are closely spaced, it may be necessary to raise the reflectivity of the divider 15 to exceed the 50 percent suggested hereinbefore in order to prevent the adjacent side frequencies of the main cavity from falling within the low loss region of curve 28. When the auxiliary cavity is properly tuned, losses at mode frequencies removed from the desired frequency $f_o$ are increased, thereby reducing the net gain below the threshold at which oscillation can be sustained. The result is more intense emission at the single desired frequency. The resonant frequency control afforded by variation of the index of refraction is particularly advantageous, as is the freedom from the critical mechanical tuning adjustments necessary in the prior art embodiments in which separate mirrors separately mounted were used.

The interrelation of the power levels at the various ports of the laser structure of FIG. 1 can be further understood by reference to FIG. 3. When the prism reflector is tuned to resonate at a given frequency, all of the power incident at this frequency is reflected back onto the laser cavity, and none is coupled out along axis 23, i.e., $P_1 = 0$. As the tuning is changed, however, some of the incident power is deflected out of the system and $P_1 > 0$. For sufficiently large detuning, the loss due to this power being coupled out of the system is so large that the laser will not oscillate. Further detuning in the same direction will cause oscillation to start at a frequency close to the next resonance of the laser cavity.

If we assume that the power out at mirror 11 is designated $P_2$ and the relative values of $P_1$ and $P_2$ are monitored, all of the incident power is reflected back into the laser cavity and $P_1 = 0$ for the prism tuned to a laser cavity resonance. At the same time, however, since this corresponds to the highest reflectivity of the prism arrangement, the power in the main laser cavity, and, hence, $P_2$ is a maximum. As the prism tuning is changed in either direction, the effective reflectivity decreases as a larger fraction of the incident power is coupled out of the system, and $P_2$ therefore decreases. Finally oscillation stops and both $P_1$ and $P_2$ are zero. It is clear, then, that $PP_1$ goes through a maximum during this process, and this maximum occurs when the detuning results in the optimum output coupling from the system.

FIG. 3 shows simultaneous representations of $P_1$ and $P_2$ as a function of the prism tuning for a laser as shown in FIG. 1, $P_1$ being depicted as curve 30 and $P_2$ as curve 31. The expanded scale used shows clearly the relationship between $P_1$ and $P_2$ already described. If the laser is tuned to operate at a frequency $f_1$ corresponding to one of the maxima of $P_1$, a small frequency shift of $(f_2 - f_1)$ causes a small amplitude variation, $\Delta_1$, in $P_1$, but a greater variation, $\Delta_2$, in $P_2$. The sign of the change in $P_2$ depends on the direction of this frequency shift. Thus, by monitoring $P_2$ when the laser is tuned to a maximum of $P_1$, a signal can be obtained whose amplitude increases if the frequency of the laser drifts in one direction and decreases if the frequency drifts in the other. If desired, this signal could be used to obtain a correction signal to be applied to a piezoelectric or other device to stabilize the frequency of the laser.

Figure 4:
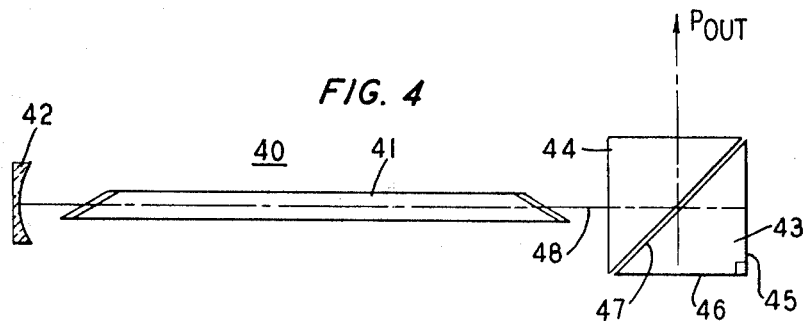
FIG. 4 is a partially schematic illustration of an alternative embodiment of the invention.

An alternate resonant prism laser embodiment incorporating the principles of the invention is shown schematically in FIG. 4. In some cases, the refraction experienced by the laser beam as it enters the isosceles prism of FIG. 1 can be undesirable. This is particularly the case when the refractive index of the prism material is high, and when the change in refraction angle with changes in the refractive index is sufficient to cause beam misalignment and thereby excessive walk-off losses. In FIG. 4, the laser 40 comprises a typical active medium 41, an end reflector 42 similar to reflector 11 in FIG. 1, and a prism combination comprising resonant reflecting prism 43 and matching prism 44. The resonant prism 43 is a right triangular prism in which the right-angle base surfaces 45, 46 form the auxiliary cavity reflectors, and the hypotenuse surface 47 forms the beam splitter at which the primary cavity energy is partially diverted from primary cavity axis 48. Reflective surface 45, of course, also acts as the second reflector of the primary cavity.

Since the internal angles of incidence and reflection of the right-angle prism must be 45°, which exceeds the angle of total internal reflection for many optical materials, the beam splitter surface 47 may not form an air-dielectric boundary. Instead, a right-angle prism 44 similar in size and shape to resonant prism 43 is interposed between the active medium 41 and the beam splitter 47 with the two hypotenuses parallel and adjacent. The matching prism 44 has a dielectric constant and index of refraction equal to the dielectric constant and mean index of reflecting prism 43, thereby preventing light refraction in transmission through the beam splitter. Since the surface of prism 44 at which energy propagating along axis 48 is incident thereon is now normal to the axis, and is suitably antireflection coated, minimum energy loss is experienced. The space between the adjacent surfaces of prisms 43, 44 is advantageously filled with a matching fluid having an index of refraction similar to that of the two prisms. Operation of the resonant prism arrangement of FIG. 4 is similar to that of FIG. 1. The addition of the second prism in the arrangement of FIG. 4 introduces several additional beam adventures per pass to the propagating energy in the primary cavity. An adventure is an encounter of light with any surface, whether in transmission or reflection. Although the use of a matching fluid is somewhat inconvenient, this embodiment has been successfully built and operated.

Figure 5:
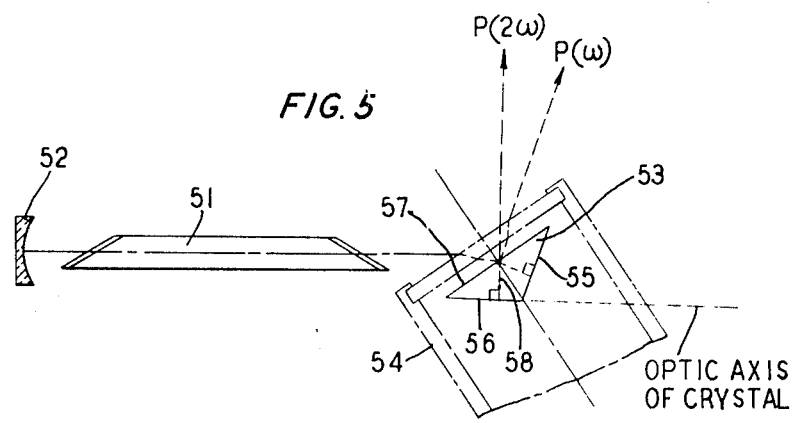
FIG. 5 is a partially schematic illustration of an embodiment of the invention in which second harmonic generation is produced.

A application of the resonant prism resonator in which second harmonic generation is achieved is shown in FIG. 5, in which active medium 51 is positioned within a primary laser cavity formed by reflector 52 and resonant prism 53.

As shown in FIG. 5, the resonant prism 53 is contained within an enclosure 54 which provides a temperature-controlled environment. The surface of the enclosure through which the laser beam passes is a Brewster angle window, typically comprising fused silica or the like. The prism 53 itself is physically identical to that of FIG. 1, i.e., it is an obtuse-triangular prism in which the beam is incident at the Brewster angle for fused silica. Surfaces 55, 56 are reflective, and surface 57 is partially reflective and serves as the beam splitter.

For second harmonic generation, prism 53 advantageously comprises KDP, with its optic axis oriented parallel to reflective surface 56. It is known that the power level of laser-generated second harmonic power can be increased by resonant techniques, either at the fundamental or at the second harmonic. Moreover, if all the available power for harmonic generation is available in a single frequency, as in the resonant prism cavity, the second harmonic power would be still further increased. For the arrangement of FIG. 5 in which the incident and output beams are oriented at the Brewster angle for the ordinary ray, several advantages accrue. First, the fundamental frequency beam resonates within the KDP prism at the high intensity level of internal laser power, and second harmonic power at $2\omega$ is generated along subaxis 58. Second, the fundamental frequency radiation is concentrated in a single mode frequency, at a level of half or more of the total available laser power in the transition. Furthermore, since the second harmonic energy propagates as an extraordinary ray through the crystal, it will be refracted out of the beam splitter surface 57 at a slightly different angle from the fundamental frequency energy, which propagates as an ordinary ray. The difference in angle should not be great, and, due to the relatively flat characteristic associated with the Brewster angle at the critical matching point, the Brewster angle window will introduce only minor losses. Still, the difference in angle will make the exiting fundamental and harmonic beams, labeled $P(\omega)$ and $P(2\omega)$, easy to separate. Finally, since the single prism element serves both as a laser mode selector and a nonlinear generator with the same ease of alignment as a single-end-mirror in a two-mirror resonator, the structure itself is simplified and the internal losses are reduced.

In general, modulation of laser beams by variable output coupling from a laser cavity requires much less power than comparable modulation of an external light beam. Also, relatively small amplitude modulation of the internal cavity energy provides output beams with much greater modulation amplitudes. The signal band of internal modulation arrangements, however, is normally limited to half the longitudinal mode spacing $c/2L$ in conventional linear resonators, to avoid uncontrolled buildup of cavity resonances by modulation sidebands or their harmonics.

The configurations of FIGS. 1 and 4, described above, overcome these limitations to a large degree, and in addition provide even greater modulation efficiency. Since the prism resonator can rather efficiently suppress all but one longitudinal laser mode, there are no other cavity resonances present which might sustain sidebands excited by variations in internal energy, even when these occur at multiples of the transit-time frequency $c/2L$. The modulation bandwidth is limited at the low-frequency end by the cavity Q to frequencies above about 1-5 MHz., and at the upper end by transit-time effects in the resonant prism, in the microwave region.

The compound single frequency resonator requires considerably less modulation power to produce the same intensity-modulated light beam than output coupling in a simple laser. One reason is that it permits the use of long, high-power lasers without the penalty of bandwidth restriction, i.e., smaller modulation amplitudes because of more intense internal beams. A more fundamental advantage stems from the greater frequency selectivity of the compound resonator in which the tuning of a very short resonator controls the output of a relatively long cavity. As illustrated in FIG. 3, the power $P_1$ coupled out of a laser cavity depends on the relative detuning from each other of the two cavities, i.e., upon the same fractional length change $\delta L/L$ of either cavity. The phase retardation which must be induced in an electro-optic prism resonator is approximately ¼N as large as that required for an ordinary output coupler, where N is the number of cavity modes in one period of the prism resonator.

In various forms of envelope modulation, in which square-law detection can be used, there is no objection to incidental frequency modulation of the light frequency, such as would be incurred when the quantities $n_2 L_2$ as well as $n_3 L_3$ are varied by means of applied signal voltages. By proper choice of materials and their orientations, it is possible for signal voltages applied normal to the plane of incidence, i.e., between electrodes on the triangular prism faces, to induce changes in $n_2 L_2$ and $n_3 L_3$ in the same sense.

Figure 6:
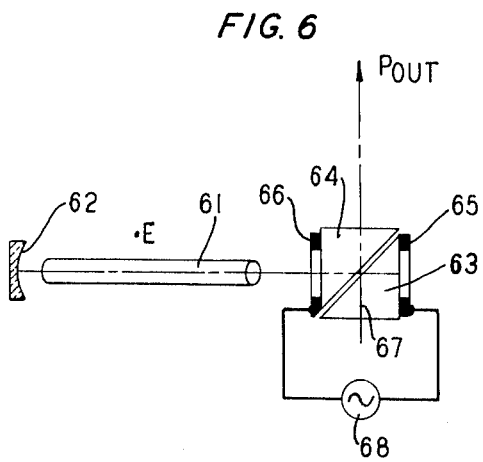
FIG. 6 is a partially schematic illustration of a modulator in accordance with the principles of the invention.

When heterodyne detection is contemplated, it is essential that the optical carrier frequency either be kept constant during intensity modulation, or if varied that it be fed as a pilot signal to the receiver for demodulation. It is possible, in the first instance, to keep the laser cavity length $L_1 + n_2 L_2$ constant as the output coupling is varied by modulating $n_3 L_3$ along, With the appropriate material, this can be accomplished by means of modulating fields in the plane of incidence, applied by means of annular electrodes. Such an arrangement is shown in FIG. 6, which is a semischematic view of a prism compound resonator particularly well suited to amplitude modulation in which the degree of output coupling is varied. As will be recalled from the discussion with reference to FIGS. 2 and 3, the power $P_1$ can be easily varied by varying the tuning of the auxiliary cavity frequency. In FIG. 6, the configuration of FIG. 4 is shown, with a particular biasing arrangement in which the index of refraction along one leg of the auxiliary cavity can be varied while the index along the other leg can be maintained constant. Specifically, active medium 61 is disposed in the cavity formed by reflector 62 and resonant prism 63. Matching prism 64 is provided to effect refractionless beam transmission into the prism resonator. Surrounding the prism structure are annular electrodes 65, 66 energized from source 68 to generate a control field in prism 63 parallel to axis 61. The annular electrodes, in the form of toroids placed on the surface of incidence of the laser beam on matching prism 64 and on the primary cavity reflective surface of resonant prism 63, produce a control field parallel to axis 61 and thus serve to modulate the resonant frequency of the auxiliary cavity by changing $n_3$ without simultaneously affecting the length of the primary cavity by changing $n_2$. The power coupled out in a direction parallel to axis 67 is thus amplitude modulated.

Figure 7:
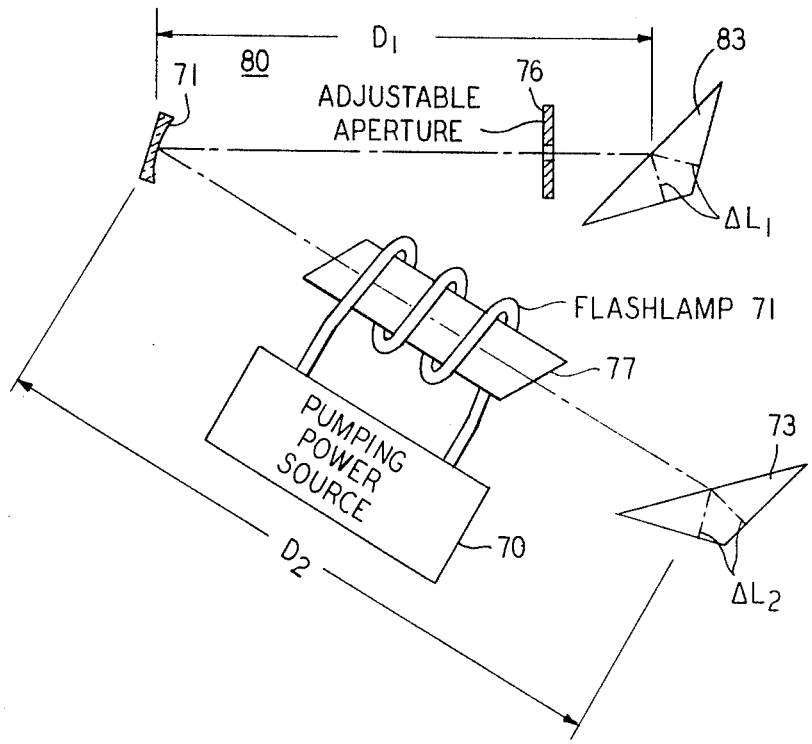
FIG. 7 is a partially schematic illustration of a tandem interferometric resonator embodiment.

In the tandem interferometric configuration of the laser resonator illustrated in FIG. 7, laser apparatus 80 includes the section of solid state active medium 77 having a Brewster-angle polished antireflection coated surface. The medium 77 is excited by a flash lamp 71 energized from a pumping power source 70.

Typically, the active medium 77 is a neodymiumion laser medium employing $Nd^+$ ions in a yttrium aluminum garnet host crystal; and the flash lamp 77 is an ordinary tungsten filament flash lamp. It is known that the oscillation bandwidth of such a solid-state laser is many times broader than the oscillation bandwidth of the gas lasers disclosed in the foregoing embodiments.

Accordingly, the optical resonator for the laser apparatus 80 comprises two prism resonators 73 and 83 having slightly different auxiliary resonator pathlengths $\Delta L_2$ and $\Delta L_1$, respectively. The frequency spacings of their resonant axial modes, commonly called free spectral ranges, are respectively $c/2 \Delta L_2$ and $C/2 \Delta L_1$. For convenience, the primary laser resonator formed between the prism resonators 73 and 83 is folded by disposing a focusing reflector 71 in appropriate orientation with respect to the prism resonators and the axis through the active medium 77. In this primary laser resonator each of the prism reflectors 73 and 83 effectively appears to be a single end reflector at the selected axial-mode frequency, since radiation builds up in each of the auxiliary resonators at that frequency so that each feeds back into the active medium nearly all of the radiation incident in that frequency. Preferably, prism resonators 73 and 83 are oriented so that their light-admitting surfaces are at the Brewster angle with respect to the radiation.

In more detail, the optical path within each of the auxiliary resonators 73 and 83 is bent symmetrically about the normal to the input surface at the point of incidence. Destructive interference for the selected axial-mode frequency prevents radiation loss at that surface for a very large percentage of the resonated radiation. In this respect, prism resonators 73 and 83 behave the same as the prism resonators of the preceding embodiments.

The advantages of the configuration for a solid-state laser are accentuated by employing adjustable-aperture device 76 disposed in the primary resonator and centered upon the optical path to block a substantial portion of modes suffering angular dispersion and also higher order transverse modes.

In operation the slight difference in pathlength of prism resonators 73 and 83 provides a vernier-type frequency selection that is mathematically analogous to the frequency selection achieved in the tandem interferometer art. Since the laser can oscillate only at axial-mode frequencies for which both prisms are simultaneously resonant, when they also present maximum reflectances to the primary laser resonator, the effective free-spectral range, or frequency spacing of resonant axial modes, of two such differing prisms can greatly exceed that of either one along. Specifically, their combined free-spectral range is given by $$(FSR)_{1,2} = m \frac{c}{2\Delta L_1} = (m-1) \frac{c}{2\Delta L_2}; \quad (4)$$

thus, $$m = \frac{\Delta L_1}{\Delta L_1 - \Delta L_2} = \frac{(FSR)_{1,2}}{(FSR)_1} \gg 1. \quad (5)$$

This combined free spectral range can easily exceed the oscillation bandwidth of any known solid state laser so that only one axial mode can oscillate. Advantageously, by choosing the radius of curvature of reflector 71 to be: $R = 2 D_2$ and disposing apertured device 76 near one of the prism resonators, an asymmetrical confocal resonator is formed which supports a mode of very large cross section in the laser-active medium 77, which is in the opposite arm of the primary resonator from device 76. More efficient use and higher power output of the medium 77 is thereby achieved.

Another modification of the embodiment of FIG. 7 for providing improved power output involves disposing another section of active mediumlike medium 77 and its associated excitation apparatus in the arm of the primary resonator between reflector 71 and prism resonator 83.

Figure 8:
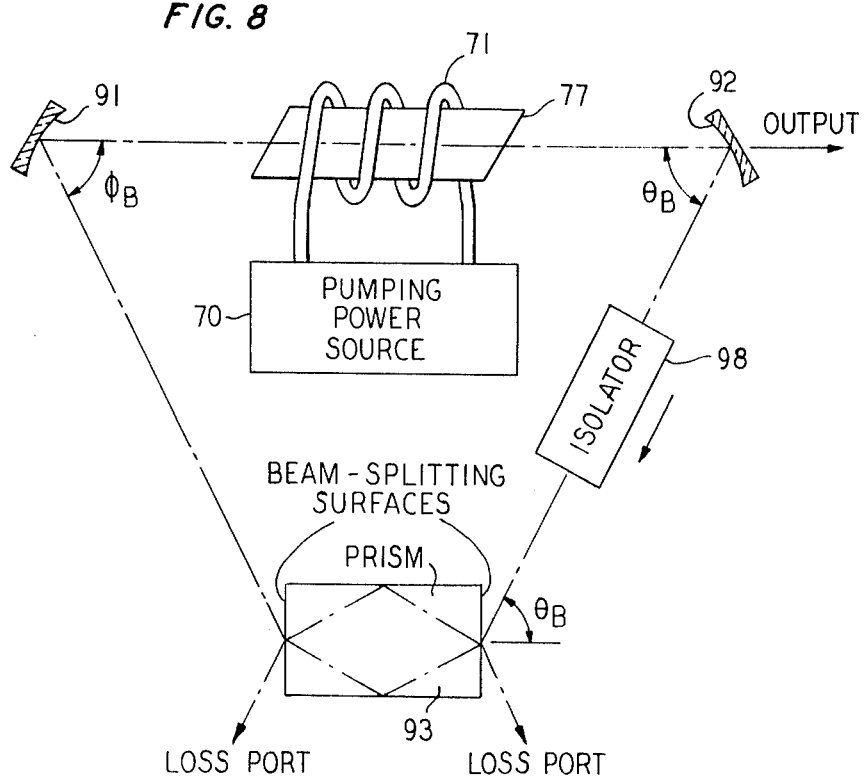
FIG. 8 is a partially schematic illustration of a ring laser embodiment according to FIG. 1.

Another form of interferometric axial-mode selection which may succeed in providing single-frequency oscillations in solid state lasers with very wide oscillation bandwidths is the ring laser configuration shown in FIG. 8. Of particular note in the embodiment of FIG. 8 is the fact that the oscillations are restricted to a unidirectional traveling wave either by means of an isolator 98 in the primary resonator or by an external retroreflector (not shown) beyond partly transmissive reflector 92 along the backward extension of the path between reflector 92 and prism 93. Such a retroreflector would be effective either where the gain medium is substantially homogeneously broadened or where the laser operates very near the center of its gain-frequency curve. The optical path through the active medium 77 in the primary resonator is provided by the obliquely oriented focusing reflectors 91 and 92; and the third reflector of the primary resonator is provided by the prism resonator 93, which simultaneously functions as the auxiliary frequency-selecting prism resonator according to my invention. In this case the prism resonator 93 is provided with four internally reflective surfaces or a set of dielectric discontinuities defining the optical path of the auxiliary resonator.

The operation of the embodiment of FIG. 8 is in some respects mathematically similar to the operation of the embodiment of FIG. 1, but differs in the following respects. In a unidirectional traveling-wave laser, such as that of FIG. 8, the Gaussian-mode field intensity is substantially uniform at all points of the optical path through the active medium 77, since the gain of medium 77 saturates homogeneously, that is, uniformly over the frequency width of the laser transition. The axial-mode frequency whose initially available gain is greatest builds up in oscillations to the exclusion of other modes, even when the prism resonator 93 provides several axial-mode resonant frequencies falling within the oscillation bandwidth of the laser. Essentially, the broadband homogeneous nature of gain saturation in such lasers induces gain competition even between those widely separated axial modes that can be resonated in prism resonator 93.

Several modifications of the embodiment of FIG. 8 may be made according to the tandem interferometric principles of the embodiment of FIG. 7. Thus, for example, one of the reflectors 91 or 92 can be replaced by a second prism resonator like prism resonator 93.

Moreover, unidirectional traveling wave ring laser configurations can also be expected to be advantageous for many gas lasers, such as those of the embodiments of FIGS. 1–6, since only weak axial-mode competition may be required in certain cases. This can be understood in more theoretical terms as follows. In standing-wave gas lasers (the so-called "linerar" configurations) each axial mode can "burn" two Lorentzian holes in the Doppler-broadened laser transition, as compared with only one hole in a unidirectional traveling-wave laser. In effect, therefore, the density of modes competing for gain is one-half as great in a traveling wave laser as in the conventional standing-wave laser, and thus can be made to oscillate with a single frequency with less loss discrimination than required in the conventional configurations.

In all cases it is to be understood that the above-described arrangements are merely illustrative of the principles of the invention. Numerous and varied additional embodiments can be devised by those skilled in the art without departing from the spirit and scope of the present invention.

What is claimed is:

1. Mode-selective coherent optical oscillator apparatus of the type comprising an active medium capable of providing gain to support optical oscillations, a primary resonator disposed about said active medium and adapted to resonate said oscillations, and at least one auxiliary resonator coupled to said primary resonator to provide interferometric axial-mode-selection among said oscillations, said apparatus being characterized in that said auxiliary resonator comprises a prism of dielectric material having at least three dielectric discontinuities forming said auxiliary resonator entirely within said dielectric material, and characterized further by means for varying a refractive index within said prism to vary said axial mode selection.

2. Mode-selective coherent optical oscillator apparatus of the type comprising an active medium capable of providing gain to support optical oscillations, a primary resonator disposed about said active medium and adapted to resonate said oscillations, a first auxiliary resonator coupled to said primary resonator to provide interferometric axial-mode selection among said oscillations, and a second auxiliary resonator of differing optical pathlength from the first auxiliary resonator, said second auxiliary resonator being coupled to said primary resonator to provide vernier axial-mode selection among said oscillations, said apparatus being characterized in that said first and second auxiliary resonators comprise respective first and second prisms of dielectric material, each one of said first and second prisms having at least three dielectric discontinuities forming its respective auxiliary resonator entirely within its own dielectric material.

3. An oscillator apparatus according to claim 2 in which the active medium is a solid state active medium.

4. Mode-selective coherent optical oscillator apparatus of the type comprising an active medium capable of providing gain to support optical oscillations, a primary ring resonator disposed about said active medium and adapted to resonate said oscillations, and at least one auxiliary ring resonator comprising a prism of dielectric material having at least four dielectric discontinuities forming said auxiliary resonator entirely within said dielectric material.

5. An oscillator apparatus according to claim 4 including means for providing unidirectional traveling-wave oscillations in said resonators.

6. The apparatus according to claim 1 in which said prism comprises electro-optic material, and the refractive index varying means comprises electrodes disposed on opposite sides of said prism and a variable source of electric potential connected between said electrodes to provide a time-varying electric field in said prism, said refractive index varying means varying the optical pathlength in said auxiliary resonator between at least two of the three dielectric discontinuities that form said auxiliary resonator.

7. The apparatus according to claim 1 in which said prism comprises a low-loss isotropic material whose refractive index can be thermally controlled, and the refractive index varying means comprises a sealed temperature controller enclosing said prism and including a Brewster-angle window between one of said dielectric discontinuities of said prism and said active medium, said temperature-controller providing a temperature-controlled dielectric environment around said prism.

8. The apparatus according to claim 7 in which said prism has an obtuse isosceles triangular cross section in planes parallel to the plane of incidence of energy thereon, said index of refraction varies monotonically with temperature, and said one dielectric discontinuity is parallel to said window.

9. The apparatus according to claim 1 in which said prism has an obtuse isosceles triangular cross section in planes parallel to the plane of incidence of said energy thereon, and said prism has a Brewster-angle dielectric discontinuity splitting the beam and diverting a portion of said beam within said prism into a transverse direction with respect to its direction of incidence, said Brewster-angle dielectric discontinuity being opposite the obtuse angle of said cross section.

10. The arrangement according to claim 9 in which said prism comprises electro-optic material having an optic axis normal to said transverse direction and in the plane of incidence of the energy incident upon said beam-splitting dielectric discontinuity, whereby second harmonic energy is generated.

11. The arrangement according to claim 10 in which said prism is enclosed within a hermetically sealed temperature-controlled environment having a window positioned at the Brewster angle with respect to the primary resonator axis to permit entry of energy propagating therealong toward said prism, said beam splitting dielectric discontinuity being parallel to said window.

12. The apparatus according to claim 1 in which said prism has a right triangular cross section in planes parallel to the plane of incidence of said energy thereon and a hypotenuse dielectric discontinuity oblique to the direction of incidence of said energy thereon, and including a matching prism of similar shape with an index of refraction equal to the mean index of the first said prism, said matching prism being positioned between the active medium and the first said prism and having its hypotenuse dielectric discontinuity parallel and adjacent to the hypotenuse dielectric discontinuity of the first said prism.